(12) United States Patent
Kato et al.

(10) Patent No.: US 7,545,992 B2
(45) Date of Patent: Jun. 9, 2009

(54) IMAGE PROCESSING SYSTEM AND IMAGE PROCESSING METHOD

(75) Inventors: Shinichi Kato, Kawasaki (JP); Hiroyuki Yaguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 429 days.

(21) Appl. No.: 11/174,458

(22) Filed: Jul. 6, 2005

(65) Prior Publication Data
US 2006/0007481 A1  Jan. 12, 2006

(30) Foreign Application Priority Data
Jul. 7, 2004   (JP) .............................. 2004-200804

(51) Int. Cl.
*G06K 9/46* (2006.01)
(52) U.S. Cl. .................. 382/239; 382/112; 382/176; 382/177; 382/180; 382/253; 358/462; 358/464; 358/470; 345/666; 709/206; 709/235
(58) Field of Classification Search .............. 382/112, 382/176, 177, 180, 239, 253; 358/462, 464, 358/470; 345/666; 709/206, 235
See application file for complete search history.

(56) References Cited

U.S. PATENT DOCUMENTS

| | | | | |
|---|---|---|---|---|
| 4,759,075 A | | 7/1988 | Lipkie et al. ............... 382/46 |
| 4,908,873 A | | 3/1990 | Philibert et al. ............ 382/34 |
| 4,935,821 A | | 6/1990 | Sano et al. ................. 358/427 |
| 5,251,268 A | * | 10/1993 | Colley et al. .............. 382/227 |
| 5,642,435 A | | 6/1997 | Loris ......................... 382/229 |
| 5,761,689 A | | 6/1998 | Rayson et al. ............. 707/533 |
| 6,043,823 A | | 3/2000 | Kodaira et al. ............ 345/433 |
| 6,104,500 A | | 8/2000 | Alam et al. ................ 358/1.15 |
| 6,138,156 A | * | 10/2000 | Fletcher et al. ............ 709/223 |
| 6,275,610 B1 | * | 8/2001 | Hall et al. .................. 382/176 |
| 6,275,850 B1 | * | 8/2001 | Beyda et al. ............... 709/206 |
| 6,360,252 B1 | * | 3/2002 | Rudy et al. ................ 709/206 |
| 6,397,213 B1 | | 5/2002 | Cullen et al. ............... 707/5 |

(Continued)

FOREIGN PATENT DOCUMENTS

CN    1276569    12/2000

(Continued)

OTHER PUBLICATIONS

Scalable Vector Graphics (SVG) 1.1 Specification W3C Recommendation Jan. 14, 2003 http://www.w3c.org/TR/SVG11/.

*Primary Examiner*—Vikkram Bali
*Assistant Examiner*—Daniel Zeilberger
(74) *Attorney, Agent, or Firm*—Fitzpatrick, Cella, Harper & Scinto

(57) ABSTRACT

This present invention provides an image processing system and image processing method which can reliably transmit image information to a destination without attaching a large file which applies load to an e-mail system or reception terminal and make the receiving side easily acquire necessary image data on the basis of determination on the receiving side. In an image input/output device (10), image information is input from an image input device (201) and stored in a HDD (208) in a control unit (200). A low-resolution image or vector data is generated from the image information in accordance with the properties of objects contained in the image information. The generated information and information about the storage location of the image information are transmitted to a designated transmission destination.

15 Claims, 14 Drawing Sheets

U.S. PATENT DOCUMENTS

| | | | |
|---|---|---|---|
| 6,466,694 B2 | 10/2002 | Kamada et al. | 382/181 |
| 6,580,820 B1 | 6/2003 | Fan | 382/135 |
| 6,687,741 B1* | 2/2004 | Ramaley et al. | 709/206 |
| 6,707,568 B1 | 3/2004 | Yu | 358/1.15 |
| 6,782,402 B1* | 8/2004 | Hidaka et al. | 709/217 |
| 6,799,717 B2 | 10/2004 | Harris | 235/375 |
| 6,944,344 B2 | 9/2005 | Imagawa et al. | 382/229 |
| 6,944,815 B2* | 9/2005 | Bierbrauer et al. | 715/530 |
| 6,977,754 B2 | 12/2005 | Matsumoto et al. | 358/1.9 |
| 7,085,437 B2 | 8/2006 | Nakajima et al. | 382/311 |
| 7,203,364 B2 | 4/2007 | Yamazaki | 382/177 |
| 7,240,077 B1 | 7/2007 | Edelman et al. | 707/203 |
| 7,248,744 B2 | 7/2007 | Cockshott | 382/253 |
| 2001/0014164 A1 | 8/2001 | Daniels et al. | 382/101 |
| 2002/0003633 A1 | 1/2002 | Matsumoto et al. | 358/1.9 |
| 2002/0037100 A1* | 3/2002 | Toda et al. | 382/166 |
| 2002/0071606 A1* | 6/2002 | Watanabe et al. | 382/177 |
| 2002/0196465 A1 | 12/2002 | Ohta | 358/1.16 |
| 2003/0019922 A1 | 1/2003 | Kuo et al. | 235/375 |
| 2003/0031371 A1* | 2/2003 | Kato et al. | 382/239 |
| 2003/0046352 A1 | 3/2003 | Katsuda et al. | 709/206 |
| 2003/0050933 A1* | 3/2003 | DeSalvo | 707/102 |
| 2003/0051044 A1 | 3/2003 | Parry et al. | 709/231 |
| 2003/0072500 A1 | 4/2003 | Sugegaya et al. | 382/305 |
| 2003/0107771 A1 | 6/2003 | Shibata | 358/3.28 |
| 2003/0197891 A1* | 10/2003 | Honda | 358/1.15 |
| 2004/0010419 A1* | 1/2004 | Sinnott | 705/2 |
| 2004/0083434 A1 | 4/2004 | Fitch | 715/541 |
| 2004/0090641 A1 | 5/2004 | Namikata | 358/1.9 |
| 2004/0141613 A1 | 7/2004 | Hayashi | 380/28 |
| 2004/0148274 A1* | 7/2004 | Warnock et al. | 707/2 |
| 2004/0151377 A1* | 8/2004 | Boose et al. | 382/193 |
| 2004/0250083 A1* | 12/2004 | Schwab | 713/182 |
| 2005/0015379 A1 | 1/2005 | Aureglia et al. | 707/100 |
| 2005/0023355 A1 | 2/2005 | Barrus | 235/462.15 |
| 2005/0071676 A1 | 3/2005 | Park et al. | 713/201 |
| 2005/0089229 A1 | 4/2005 | Morishia | 382/218 |
| 2005/0111052 A1 | 5/2005 | Nishikawa et al. | 358/448 |
| 2005/0111053 A1 | 5/2005 | Yoshida et al. | 358/448 |
| 2005/0123209 A1 | 6/2005 | Kitora et al. | 382/243 |
| 2005/0144136 A1 | 6/2005 | Murashita | 705/51 |
| 2005/0262243 A1 | 11/2005 | Ternasky et al. | 709/225 |
| 2005/0271296 A1 | 12/2005 | Tsuji et al. | 382/275 |
| 2005/0286805 A1 | 12/2005 | Yoshida | 382/305 |
| 2005/0288943 A1* | 12/2005 | Wei et al. | 705/1 |
| 2006/0008113 A1 | 1/2006 | Matsukubo et al. | 382/100 |
| 2006/0008114 A1 | 1/2006 | Sekiguchi et al. | 382/100 |
| 2006/0010115 A1 | 1/2006 | Yoshida et al. | 707/3 |
| 2006/0010116 A1 | 1/2006 | Yaguchi et al. | 707/3 |

FOREIGN PATENT DOCUMENTS

| | | |
|---|---|---|
| CN | 1277410 | 12/2000 |
| EP | 1 058 199 A2 | 12/2000 |
| GB | 2 313 729 A | 12/1997 |
| JP | 2-184173 | 7/1990 |
| JP | 4-34650 | 2/1992 |
| JP | 4-302073 | 10/1992 |
| JP | 5-12402 | 1/1993 |
| JP | 5-28254 | 2/1993 |
| JP | 5-303644 | 11/1993 |
| JP | 5-334430 | 12/1993 |
| JP | 5-342408 | 12/1993 |
| JP | 6-46271 | 2/1994 |
| JP | 6-119448 | 4/1994 |
| JP | 6-178066 | 6/1994 |
| JP | 6-270477 | 9/1994 |
| JP | 6-290264 | 10/1994 |
| JP | 7-36433 | 2/1995 |
| JP | 7-85221 | 3/1995 |
| JP | 8-242326 | 9/1996 |
| JP | 9-50433 | 2/1997 |
| JP | 10-293737 | 11/1998 |
| JP | 11-185018 | 7/1999 |
| JP | 11-232296 | 8/1999 |
| JP | 11-284835 | 10/1999 |
| JP | 11-312244 | 11/1999 |
| JP | 2000-261574 | 9/2000 |
| JP | 2000-322425 | 11/2000 |
| JP | 2001-218030 | 8/2001 |
| JP | 2003-22307 | 1/2003 |
| JP | 2003-107119 | 4/2003 |
| JP | 2003-134327 | 5/2003 |
| JP | 2003-169169 | 6/2003 |
| JP | 2003-248832 | 9/2003 |

* cited by examiner

FIG. 6

BLOCK INFORMATION

| | PROPERTY T | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | AVAILABLE |
| BLOCK 2 | 3 | X2 | Y2 | W2 | H2 | AVAILABLE |
| BLOCK 3 | 2 | X3 | Y3 | W3 | H3 | NOT AVAILABLE |
| BLOCK 4 | 1 | X4 | Y4 | W4 | H4 | AVAILABLE |
| BLOCK 5 | 3 | X5 | Y5 | W5 | H5 | AVAILABLE |
| BLOCK 6 | 5 | X6 | Y6 | W6 | H6 | NOT AVAILABLE |

PROPERTY  1 : text  2 : picture  3 : table  4 : line  5 : photo

INPUT FILE INFORMATION

| TOTAL NUMBER OF BLOCKS | N(=6) |
|---|---|

F I G. 14A
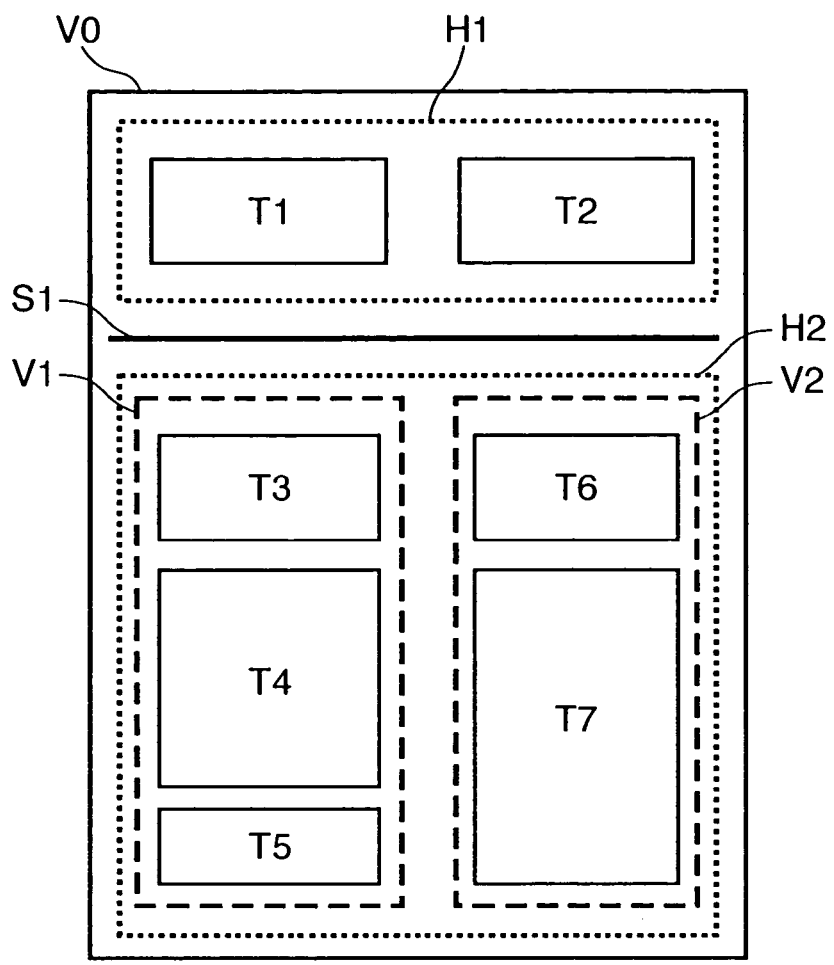
F I G. 14B
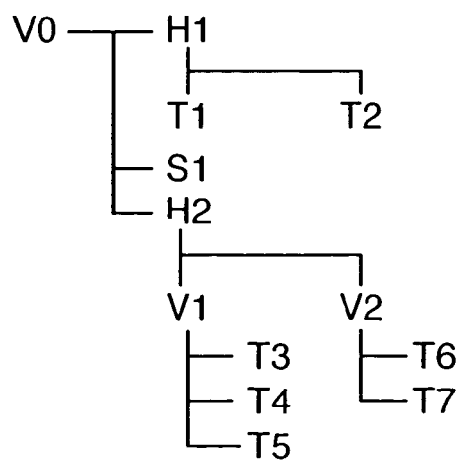

IMAGE PROCESSING SYSTEM AND IMAGE PROCESSING METHOD

FIELD OF THE INVENTION

The present invention relates to an image processing system and image processing method which transmit/receive image information.

BACKGROUND OF THE INVENTION

Along with a recent growing interest in environmental issues, move to paperless offices has rapidly been promoted. For this purpose, there is conventionally known a document management system which reads paper documents accumulated in binders by using a scanner, converts the read images into portable document format (to be abbreviated as "PDF" hereinafter) data, and accumulates them in an image storage device as a database.

An image processing system has also been developed, which reads a paper document by using a scanner, extracts objects such as characters, tables, and illustrations on the document by executing image processing such as OCR (Optical Character Recognition) and edge extraction, and generates reusable vector data (e.g., Japanese Patent Laid-Open No. 5-342408).

In image communication to transmit/receive image information between terminals, especially for the purpose of transfer to a specific person, a facsimile apparatus which transmits/receives image information in accordance with a dedicated protocol by mainly using a public network or a method of attaching an image file to e-mail between computer thermals connected through a network is used (e.g., Japanese Patent Laid-Open No. 8-242326).

Along with penetration of the Internet, a WWW (World Wide Web) system which uses a computer communication network has received a great deal of attention, although it does not aim at transfer to a specific person. The WWW system is a client/server system based on a communication protocol TCP/IP, like an Internet application such as e-mail. The WWW system is developing as an information search/providing system which is implemented by transmitting various kinds of data handled on computers, including not only image information but also text, audio, and moving image data; between a WWW server application and a client application having GUI (Graphical User Interface) called a "WWW browser".

However, when image communication by the conventional facsimile apparatus as described above is used, the user cannot confirm the transmitted image until it is printed on the receiving side. Even when the information is unwanted for the receiving side, it cannot be recognized in advance so reception cannot be avoided. In addition, a facsimile apparatus which assumes image transfer between apparatuses is often shared by a plurality of persons. For this reason, the system does not guarantee that data is reliably received by a target person. Also, anyone except the target person may see the received contents. Furthermore, a sender who wants the target person confirm the transmitted image must use another means such as a telephone to confirm it.

According to the above-described method of attaching an image file to e-mail between computer terminals connected through a network, the reliability of transfer to a target person, i.e., a conventional problem unsolved, can be ensured because e-mail targeted to an individual is used.

However, even in the conventional method using e-mail, a received image can be confirmed only after communication finishes, like the case of a facsimile apparatus. In addition, even information unwanted for the receiving side cannot be recognized in advance so reception cannot be avoided.

E-mail essentially aims at transmitting/receiving text data. When a high-quality image file having a high resolution usable for printing is attached, the data transfer amount is enormous, resulting in large load on the e-mail server. Additionally, to cause the display device of the receiving-side terminal to display the image file, display application software is necessary. This requires a large memory capacity and also applies heavy load to the CPU.

SUMMARY OF THE INVENTION

The present invention has been proposed to solve the conventional problems, and has as its object to provide an image processing system and image processing method which can reliably transmit image information to a destination without attaching a large file which applies load to an e-mail system or reception terminal and make the receiving side easily acquire necessary image data on the basis of determination on the receiving side.

In order to solve the above problems, according to the present invention, there is provided an image processing system comprising:

an input unit, adapted to input image information;

a storage unit, adapted to store the image information;

a generation unit, adapted to generate predetermined information from the image information in accordance with properties of objects contained in the image information; and a transmission unit, adapted to transmit the generated information and information about a storage location of the image information to a predetermined transmission destination.

The image processing system is characterized in that the generation unit comprises a segmentation unit, adapted to segment the image information into a plurality of objects, a property definition unit, adapted to define the property of each of the segmented objects, and an image processing unit, adapted to execute, for the image information, an image process according to a ratio of predetermined property objects of the plurality of objects to generate the predetermined information from the image information.

According to the present invention, there is also provided an image processing method comprising:

an input step of inputting image information;

a storage step of storing the image information;

a generation step of generating predetermined information from the image information in accordance with properties of objects contained in the image information; and a transmission step of transmitting the generated information and information about a storage location of the image information to a predetermined transmission destination.

The image processing method is characterized in that the generation step comprises a segmentation step of segmenting the image information into a plurality of objects, a property definition step of defining the property of each of the segmented objects, and an image processing step of executing, for the image information, an image process according to a ratio of predetermined property objects of the plurality of objects to generate the predetermined information from the image information.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 6 is a table showing an example of block information of respective blocks obtained by the block selection process in step S406;

FIGS. 14A and 14B are views for explaining the outline of a document structure tree.

DETAILED DESCRIPTION OF THE PREFERRED EMBODIMENT

The arrangement of an image processing system according to a preferred embodiment of the present invention and the contents of various kinds of image processes using the system will be described below with reference to the accompanying drawings.

[Arrangement of Image Processing System]

Figure 1:
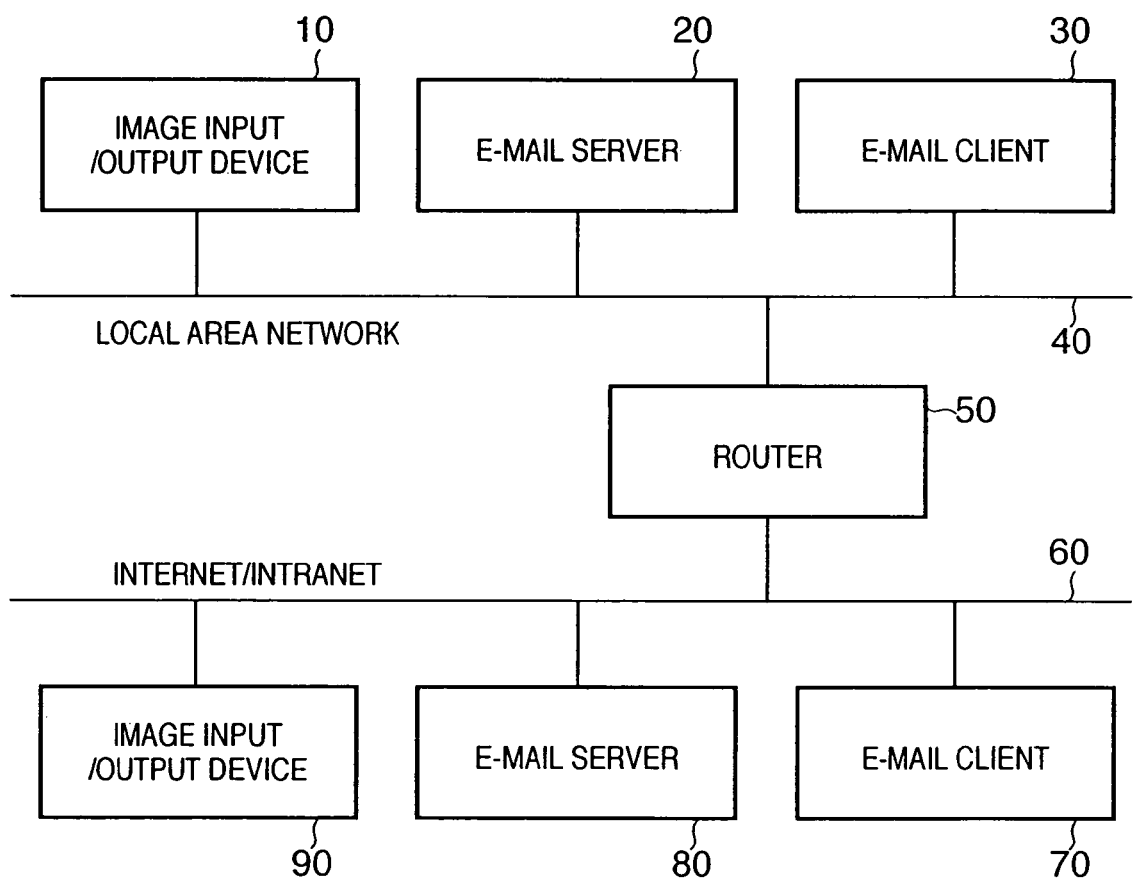
FIG. 1 is a block diagram showing the arrangement of an image processing system according to an embodiment of the present invention.

FIG. 1 is a block diagram showing the arrangement of an image processing system according to an embodiment of the present invention. In the image processing system shown in FIG. 1, an image input/output device 10 comprises an image input device including, e.g., a scanner and an image output device including, e.g., a printer, as will be described later. Image data read from the image input device of the image input/output device 10 can be supplied to a LAN (Local Area Network) 40. Alternatively, image data received from the LAN 40 can be printed by the image output device of the image input/output device 10. Although not illustrated in FIG. 1, transmission/reception by a facsimile apparatus using a public network is also possible in addition to image data transmission/reception using the LAN 40.

In the image processing system shown in FIG. 1, an e-mail server 20 can receive image data read by the image input/output device 10 as an attached file of e-mail. An e-mail client 30 can receive and browse e-mail received by the e-mail server 20 or transmit e-mail.

In the image processing system shown in FIG. 1, a router 50 couples the LAN 40 to Internet/intranet 60 to enable connection. An e-mail client 70 has the same function as the e-mail client 30. An e-mail server 80 has the same function as the e-mail server 20. An image input/output device 90 has the same function as the image input/output device 10. The e-mail client 70, e-mail server 80, and image input/output device 90 are connected to the Internet/intranet 60.

Although not illustrated in FIG. 1, the image processing system according to this embodiment may be formed by a network system including a database server or database client capable of accumulating image data read by the image input/output device 10 or managing and saving image data, and also a WWW server to provide HTML documents onto the LAN 40.

[Arrangement of Control Unit of Image Input/Output Device 10]

Figure 2:
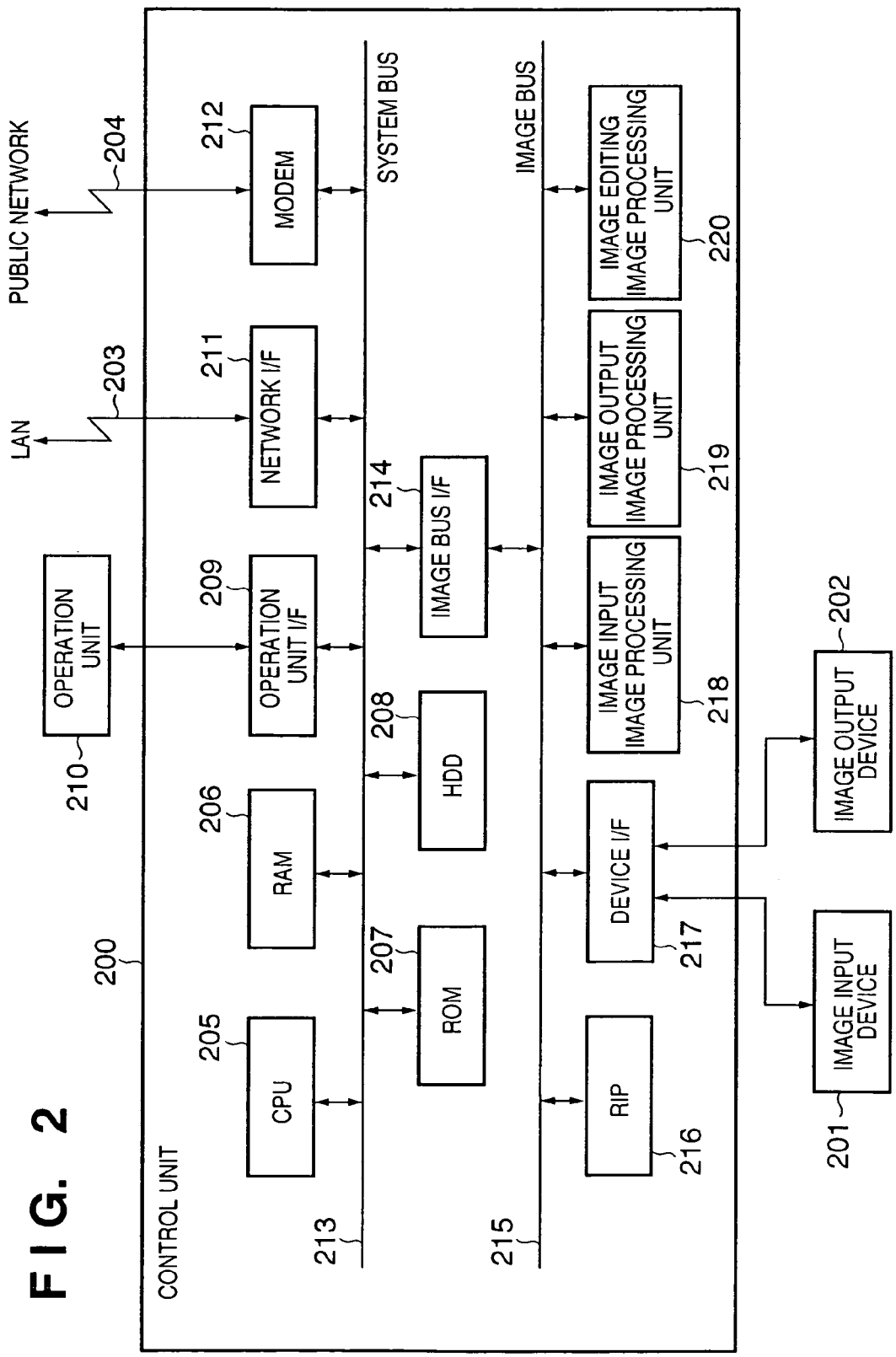
FIG. 2 is a block diagram showing an arrangement example of the control unit of an image input/output device 10 in the image processing system according to the embodiment.

FIG. 2 is a block diagram showing an arrangement example of the control unit (controller) of the image input/output device 10 in the image processing system according to this embodiment. Referring to FIG. 2, a control unit 200 is connected to an image input device 201 including, e.g., a scanner and an image output device 202 including, e.g., a printer and controls image data reading and print output. The control unit 200 is also connected to a LAN 203 and public network (WAN) 204 to input/output image information or device information through the networks.

In the control unit shown in FIG. 2, a CPU 205 is a central processing unit to control the entire system. A RAM 206 is a system work memory to make the CPU 205 operate. The RAM 206 also serves as an image memory to temporarily store input image data. A ROM 207 is a boot ROM which stores the boot program of the system. An HDD 208 is a hard disk drive which stores system software for various kinds of processes and input image data.

Referring to FIG. 2, an operation unit I/F 209 is an interface unit for an operation unit 210 which has a display screen capable of displaying image data. The operation unit I/F 209 outputs image data to the operation unit 210. The operation unit I/F 209 also transmits information input from the operation unit 210 by the operator to the CPU 205. A network interface 211 is implemented by, e.g., a LAN card which is connected to the LAN 203 to input/output information from/to an external device. A modem 212 is connected to the public network 204 to input/output information from/to an external device.

In the control unit 200 according to this embodiment, the above-described devices are arranged on a system bus 213.

An image bus I/F 214 is an interface to connect the system bus 213 to an image bus 215 which transfers image data at a high speed. The image bus I/F 214 serves as a bus bridge to convert a data structure. The image bus 215 includes a PCI bus or IEEE1394.

A RIP (Raster Image Processor) 216, device I/F 217, image input image processing unit 218, image output image processing unit 219, and image editing image processing unit 220 to be described below are connected to the image bus 215.

The RIP 216 rasterizes a PDL code into a bitmap image. The device I/F 217 connects the image input device 201 including, e.g., a scanner and the image output device 202 including, e.g., a printer to the control unit 200 and executes synchronous/asynchronous conversion of image data.

The image input image processing unit 218 executes various kinds of processes such as correction, manipulation, and editing for input image data. The image output image processing unit 219 executes processes such as printer correction and resolution conversion for print output image data. The image editing image processing unit 220 executes various kinds of image processes such as image data rotation, image data compression/expansion process, and vectorization process (to be described later).

[Arrangement of Image Input/Output Device 10]

Figure 3:
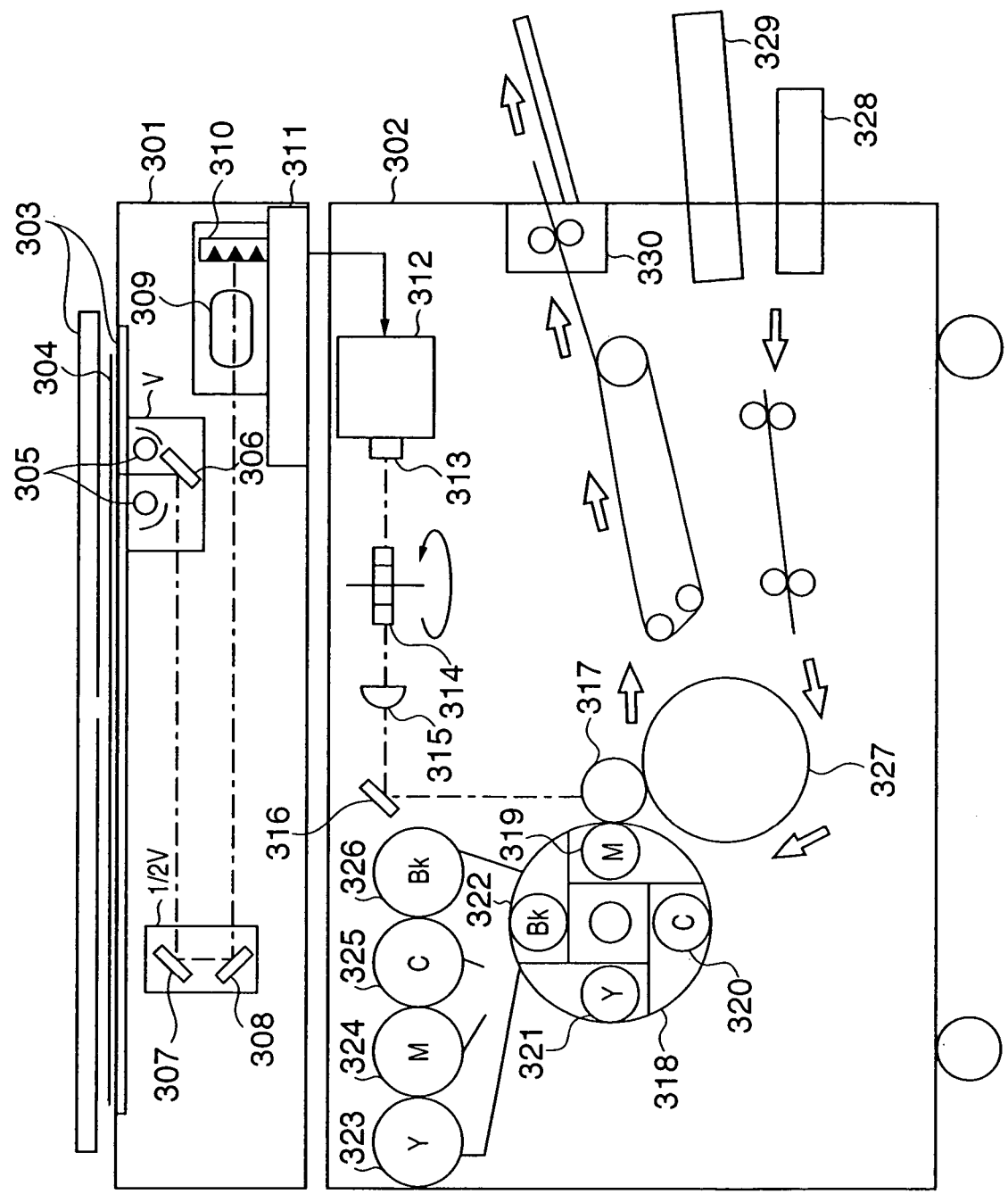
FIG. 3 is a sectional view showing an example of the arrangement of the image input/output device 10 in the image processing system according to the embodiment.

FIG. 3 is a sectional view showing an example of the arrangement of the image input/output device 10 in the image processing system according to this embodiment. An example of the image input/output device 10 which digitally reads a color document image and generates a copy image will be described below.

Referring to FIG. 3, a scanner unit 301 corresponds to the image input device 201 shown in FIG. 2, which reads a document and executes digital signal processing. A printer unit 302 corresponds to the image output device 202 shown in FIG. 2, which prints, on a printing paper sheet, a full-color image corresponding to a document image read by the scanner unit 301.

A document 304 is set between a mirror platen and a document glass table 303. When a scan or copy instruction is input from the operation unit 210 (not shown in FIG. 3) in FIG. 2, the document 304 is irradiated with a lamp 305. Reflected light is guided to mirrors 306, 307, and 308. The reflected light forms an image on a 3-line solid-state image sensing element sensor (to be referred to as a "CCD" hereinafter) 310 via a lens 309 and sent to a controller 311 as three, red (R), green (G), and blue (B) image signals as fulle-color information.

The controller 311 corresponds to the control unit 200 shown in FIG. 2. In a direction perpendicular to the electrical scanning (main scanning) direction of the line sensor, the lamp 305 and mirror 306 mechanically move at a velocity v, and the mirrors 307 and 308 move at a velocity ½v to scan (sub-scan) the entire surface of the document 304. In the example of the scanner unit 301 shown in FIG. 3, the document 304 is read at a resolution of 600 dpi (dots/inch) in both the main scanning and sub-scanning directions.

A case wherein image data (scan image) scanned by the scanner unit 301 (image input device 201) is distributed to another device through the LAN 203 or public network 204 will be described below. In this case, the image input image processing unit 218 executes a predetermined image input image process for the scan image. Next, the image editing image processing unit 220 executes an appropriate image process in accordance with the distribution destination. Then, the processed image data is distributed from the network I/F 211 or modem 212 through the LAN 203 or public network 204.

A case wherein a scan image undergoes so-called copy will be described next. In copying a scan image, the image input image processing unit 218 executes a predetermined image input image process, and the image editing image processing unit 220 then executes an image process. After that, the image output image processing unit 219 electrically processes the read image signal to decompose it into magenta (M), cyan (C), yellow (Y), and black (Bk) components. The generated density signal values are sent to the printer unit 302. In the image input/output device according to this embodiment, the image signal of one of the M, C, Y, and Bk components is sent to the printer unit 302 in one cycle of document read scanning by the scanner unit 301. A full-color image is printed by a total of four cycles of document read scanning.

The process by the printer unit 302 will be described next in detail. M, C, Y, and Bk image signals from the scanner unit 301 are sent to a laser driver 312. The laser driver 312 modulates and drives a semiconductor laser 313 in accordance with the received image signals. A laser beam scans a photosensitive drum 317 through a polygon mirror 314, f-θ lens 315, and mirror 316. Like reading, an image is written at a resolution of, e.g., 600 or 1,200 dpi in both the main scanning and sub-scanning directions.

A rotating developer device 318 includes a magenta developer unit 319, cyan developer unit 320, yellow developer unit 321, and black developer unit 322. The four developer units sequentially contact the photosensitive drum 317 and develop an electrostatic latent image formed on the photosensitive drum by toner.

Y, M, C, and K toner storage units 323, 324, 325, and 326 have toner containers of corresponding colors and supply toners for developing. A printing paper sheet supplied from a paper cassette 328 or 329 is wound around a transfer drum 327 so that the image developed on the photosensitive drum is transferred to the paper sheet.

In the printer unit 302, after the four colors (M, C, Y, and Bk) are sequentially transferred, the printing paper sheet passes through a fixing unit 330. The toners are fixed on the printing paper sheet. Then, the paper sheet is discharged to the outside.

[Image Transmission Process Procedures]

Figure 4:
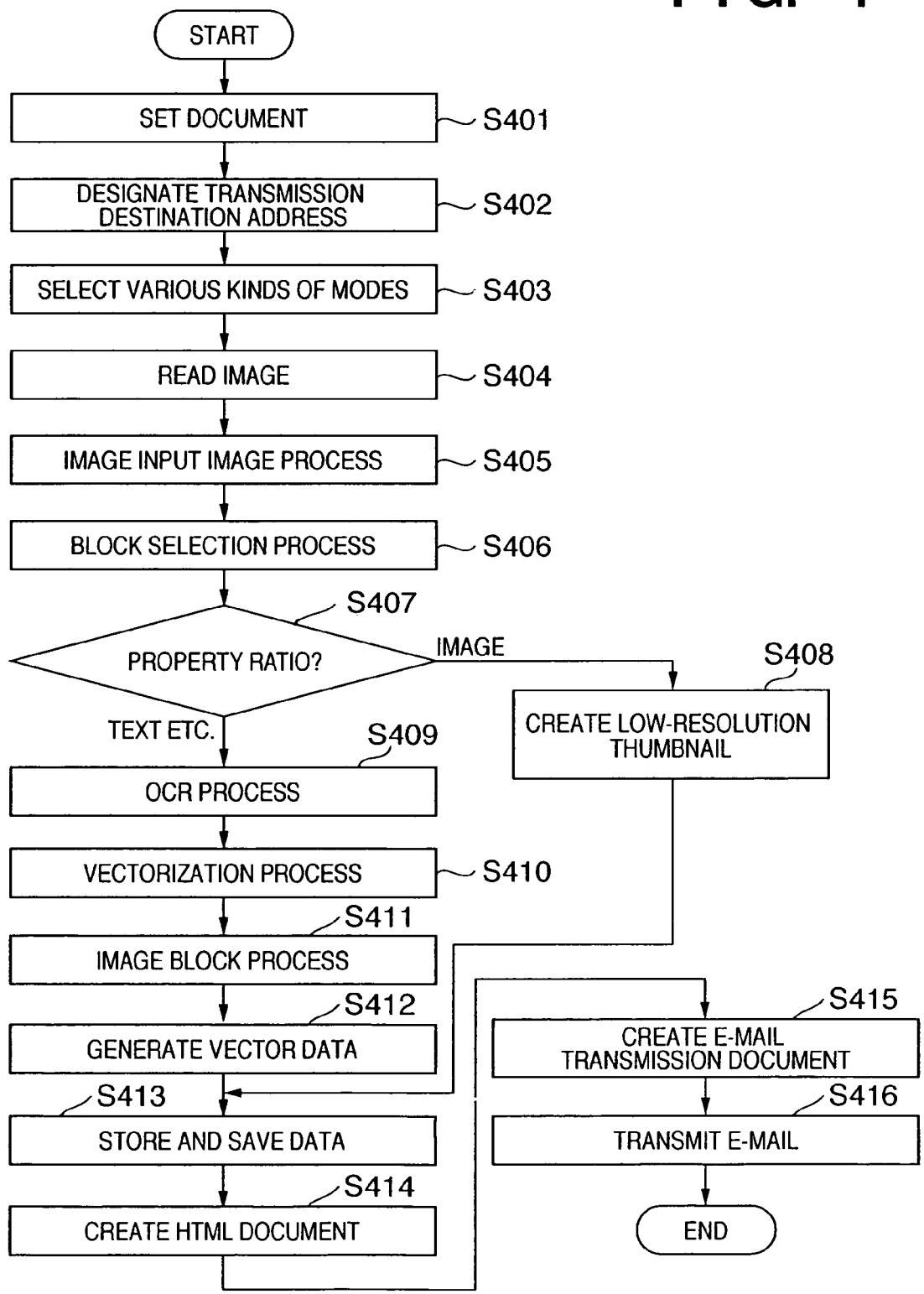
FIG. 4 is a flowchart for explaining the processing operation by the image transmission function of the image input/output device according to the embodiment.

FIG. 4 is a flowchart for explaining the processing operation by the image transmission function of the image input/output device according to this embodiment. More specifically, a process related to an image transmission function of operating the operation unit 210 of the image input/output device 10 to transmit an image to a predetermined transmission destination by e-mail will be described.

The operator who will transmit an image sets a document to be transmitted on the document table 303 of the image input device 201 (scanner unit 301) (step S401). The operator selects the image transmission function mode by using the operation unit 210. At this time, he/she inputs the address of a predetermined transmission destination by using the operation unit 210 in accordance with a message displayed on the display screen of the operation unit 210. Alternatively, he/she selects the address of the transmission destination from an address book in which the address of the transmission destination is registered and saved in advance (step S402). When inputting the address, a form text or comment prepared in advance can be added by the operator's operation.

Various kinds of mode setting such as transmission image resolution setting and color/monochrome selection necessary for transmission are executed (step S403).

If the set contents are correct, the operator presses a start key provided on the operation unit 210 so that the document scan operation starts in the image input device 201 (step S404).

When the scan operation starts, read image data is subjected to a predetermined image input image process by the image input image processing unit 218 in the control unit 200 (step S405). Then, the image data is edited by the image editing image processing unit 220 to image data suitable for transmission. Details of the processes executed here will be described later. In this embodiment, a block selection process is executed in which scanned image data is separated into image regions on the basis of predetermined properties, and properties such as text, caption, line art, photo, and background are defined for objects in the scan image for the respective image regions (step S406).

The block selection (BS) process in step S406 will be described. In the block selection process, regions are separated into text/line art portions and halftone image portions. Each text portion is further separated into text blocks combined as clusters for the respective paragraphs or properties such as narrow lines, graphics, and tables so that objects are segmented. On the other hand, each image portion expressed by halftone is segmented into independent objects for the respective so-called blocks such as a block image portion and background portion, which are separated into rectangles. In the mode setting process in step S403 described above, the property types to be segmented by the block selection process may be designated. In this case, the property types of objects to be segmented are determined in accordance with the selected vector mode.

When, e.g., a Text/Graphic/Table/Image mode is designated, objects are segmented into properties including Text (text), Graphic (narrow line and graphic), Table (table), Image (image), and Background (background). When a Text mode is designated, objects are segmented in accordance with properties including Text (text) and Background (background).

"Background" (background) is not included in the notation of vector mode selection because a region except Text (text) objects is defined as Background (background) in, e.g., the Text mode. However, the notation "Text mode" may be changed to "Text/Background mode", as a matter of course. Detailed examples of vector modes will be described below.

1. Text/Graphic/Table/Image mode
   →Objects are segmented into Text (text), Graphic (narrow line and graphic), Table (table), Image (image), and Background (background)
2. Text/Graphic/Image mode
   →Objects are segmented into Text (text), Graphic (narrow line, graphic, and table), Image (image), and Background (background)
3. Text/Image mode
   →Objects are segmented into Text (text), Image (narrow line, graphic, table, and image), and Background (background)
4. Text mode
   →Objects are segmented into Text (text) and Background (narrow line, graphic, table, image, and background)
5. Image mode
   →Objects are segmented into Image (text, narrow line, graphic, table, and image) and Background (background)

As described above, in this embodiment, examples of properties are Text (text), Graphic (narrow line and graphic), Table (table), Image (image), and Background (background). However, the property types are not limited to this, and all the property types need not always be used. Detailed examples of vector modes are Text/Graphic/Table/Image, Text/Graphic/Image, Text/Image, Text, and Image modes. However, the mode types are not limited to these, and all the mode types need not always be used.

The numbers of properties defined on the basis of the result in step S406 are compared. In accordance with the comparison result, the transmission form to the transmission destination is changed (step S407). For example, in this embodiment, as the process in step S407, the numbers of properties are compared, and the transmission form is switched between a mode wherein the thumbnail image of input image information is generated and attached and a mode wherein the image information is vectorized, and only necessary information is attached.

For example, when objects are segmented in the Text/Graphic/Image mode, and the number of objects having Image property is large (when it is determined as "image" in step S407), the image information is not vectorized. However, if the scan image is directly attached to e-mail as an attached file, the data transfer amount becomes enormous. To prevent this, in this embodiment, the image editing image processing unit 220 converts the resolution of the scan image to generate a low-resolution thumbnail image (step S408). The thumbnail image is stored and saved in the HDD 208 in correspondence with the original scan image (step S413).

When objects are segmented in the Text/Graphic/Image mode, and the number of objects having Text property or Graphic property is large, a vectorized file is generated. More specifically, in this embodiment, the image editing image processing unit 220 generates a vectorized file (step S412). The vectorized file is stored and saved in the HDD 208 in correspondence with the original scan image (step S413).

When the number of objects having Text property or Graphic property is large (when it is determined as "text etc." in step S407), a vectorization process is executed for image information as an object segmented in accordance with the property in step S406 to convert image data into a vector data file. To do this, an OCR process is performed first (step S409).

For a text block which has undergone the OCR process, a vectorization process is executed to recognize the character size, style, and font and convert the data into font data which are visually faithful to characters obtained by scanning the document (step S410). For a table or graphic block formed of lines, outline specifying or function approximation is done, thereby executing the vectorization process. For an image block, the image is processed as an individual JPEG file as image data (step S411).

When, e.g., the Text/Graphic/Table/Image mode is designated in step S403, a Text (text) object is converted into font data. A Graphic (narrow line and graphic) object is subjected to outline specifying or function approximation so that the object is vectorized as a function. For a Table (table) object, numerical value information is converted into font data. For the table portion, outline specifying or function approximation is executed so that the object is vectorized as a function. Each numerical value is linked as cell information and coded as a table object. An Image (image) object is saved as JPEG data with a low compression ratio while maintaining the reading resolution (600 dpi) of the image input device 201. For a Background (background) object, the reading resolution is converted into a low resolution (300 dpi), and then, the object is saved as JPEG data with a high compression ratio.

When, e.g., the Text mode is designated in step S403, a Text (text) object is converted into font data. Narrow line, graphic, table, and image regions are handled like a Background (background) object. That is, after resolution conversion to 300 dpi is executed, the object is saved as JPEG data with a high compression ratio.

As described above, various kinds of vectorization modes are prepared, and the properties for the vectorization process are appropriately changed. Hence, the amount of generated vector data and the image quality can arbitrarily be changed in accordance with the purpose.

After the above-described vectorization process is ended, the vector data are generated in correspondence with the layout information of the objects (step S412). Then, the vector data are stored and saved in the HDD 208 in correspondence with the original scan image (step S413). The generated vector data is converted into a reusable format, i.e., a general-purpose format such as RTF (Rich Text Format), SVG, or PDF.

The vector data obtained in accordance with the above-described procedures contain vector information which has an editable format and is visually very close to the read document image. Hence, the data can directly be manipulated, reused, or subjected to processes such as storage, transfer, and reprint.

The vector data generated by the above-described process expresses a character or narrow line by a description code. Hence, for the vector data, the information amount is reduced, the storage efficiency increases, and the transfer time is shortened as compared to a case wherein image data (raster bitmap data) is simply used. The data can be used as high-quality data when it is printed or displayed.

As described above, thumbnail image generation (step S408) or vectorized file generation (step S412) is ended, and the data are stored and saved in the HDD 208. Then, pointer information (storage location information) representing the location of the original scan image is generated as a text (HTML document) described by HTML (HyperText Markup Language) (step S414).

The location of the HTML document (HTML file) and display data is described by, e.g., URL (Uniform Resource Locator) which one-dimensionally expresses an information resource on the Internet. An example of the general format of URL used in the WWW (World Wide Web) system is "resource_type://host.domain/path".

In this URL, "resource_type" indicates the protocol or service in use. In the image processing system according to this embodiment, http (hyper text transfer protocol) is designated. Alternatively, gopher, ftp, or nntp can be used, and a description thereof will be omitted. In addition, "host.domain" indicates an address of the server to be accessed on the Internet and is designated by an IP address or domain format. In the image processing system of this embodiment, the IP address of the WWW server in the system is designated.

Also, "path" indicates the position of a file on the server. In the image processing system of this embodiment, for example, the location of the above-described HTML file is expressed as "http://Server-ip-address/□□□/xxx.html". The location of check display data of a saved transmission image is described by using the HTML tag as "<IMG SRC="http://Server_ip_address/□□□/ooo.ΔΔΔ">".

As the extension ΔΔΔ of the image file, a compression image file such as GIF or JPG is usually used. These data can be interpreted by a WWW browser as a client application of the WWW system. The WWW browser can request an image file ooo.ΔΔΔ of the WWW server of the image processing system and display the image.

After the HTML document is created in step S414, a transmission document is created on the basis of an existing general-purpose e-mail format in accordance with the transmission destination, form text, or comment set or input in step S402 (step S415). The location of the HTML file and one of the low-resolution thumbnail image and vector data, which are created and saved in step S408, S412, and S413, are attached to the e-mail transmission document. The e-mail transmission document created in this way is transmitted to the designated transmission destination as e-mail by the e-mail transmission function provided in the image input/output device 10 (step S416). The e-mail transmitted from the image input/output device 10 reaches the e-mail client 30 of the transmission destination through the e-mail server 20 shown in FIG. 1.

[E-Mail Reception Process Procedures Based on Image Transmission Function]

The e-mail recipient can confirm, on the display screen, the contents of the e-mail document received by a mail client application. The e-mail contents include information representing that the e-mail is sent by the special image transfer service as in this embodiment, a text to prompt access by the WWW browser to the attached URL, information about the sender, and comment from the sender. The description contents are not limited to this. These pieces of information can also implicitly be handled as needed. In this embodiment, one of the low-resolution thumbnail image and vector data is attached in accordance with the type of the document scanned by the image input/output device 10. More specifically, when the number of image portions is large, the thumbnail image is used. When the number of vectorized portions is large, the vector data is used. In attaching the vector data, the resolution of image portions is preferably decreased as compared to the original data to reduce the data size.

Both the low-resolution thumbnail image and vector data can immediately be confirmed if the WWW browser can be activated in browsing them. However, if the e-mail client does not have this browser function, the e-mail may be transmitted from the image input/output device 10 together with URL representing the location of an image viewer to display images so that the images can be browsed.

In this case, the recipient of the e-mail client can receive the original scan image directly from the image input/output device 10 without intervening the mail server on the basis of the URL representing the location of the original scan image as needed.

In this arrangement, even in the method of attaching an image file to e-mail between computer terminals connected through a network, when a low-resolution thumbnail image or vector data which does not deteriorates by enlargement or reduction because it does not depend on the resolution, the recipient can easily grasp the contents of image information. When vector data is received, it can freely be enlarged or reduced without deteriorating the image quality, unlike image information. Hence, download of the original high-quality image file is rarely necessary.

As described above, the problem that heavy load is applied to the e-mail server by transferring an enormous data amount assuming reception of a high-quality scan image can be solved. Hence, image data can easily and reliably be transmitted to a recipient without increasing load on the e-mail server. In addition, the problem that display application software is necessary for causing the display device of the terminal which has received the image data to display the data, a large memory capacity is required, and heavy load is applied to even the CPU can be solved. Hence, image data can easily and reliably be transmitted to the recipient.

Each process block related to the above-described vectorization process will be described below in detail.

[Block Selection Process (Step S406)]

Figure 5:
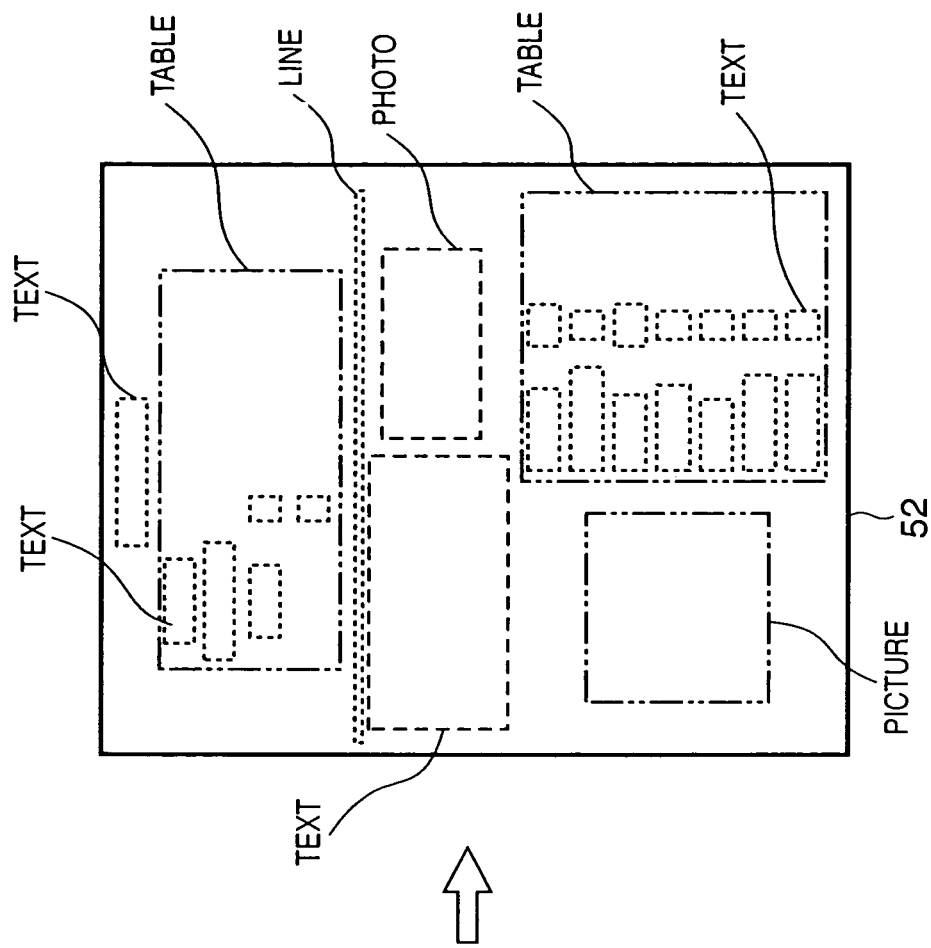
FIG. 5 is a view showing a state wherein image information of one page read by an image input device is segmented into a plurality of blocks by determining the property of each object contained in the image information.
Figure 5:
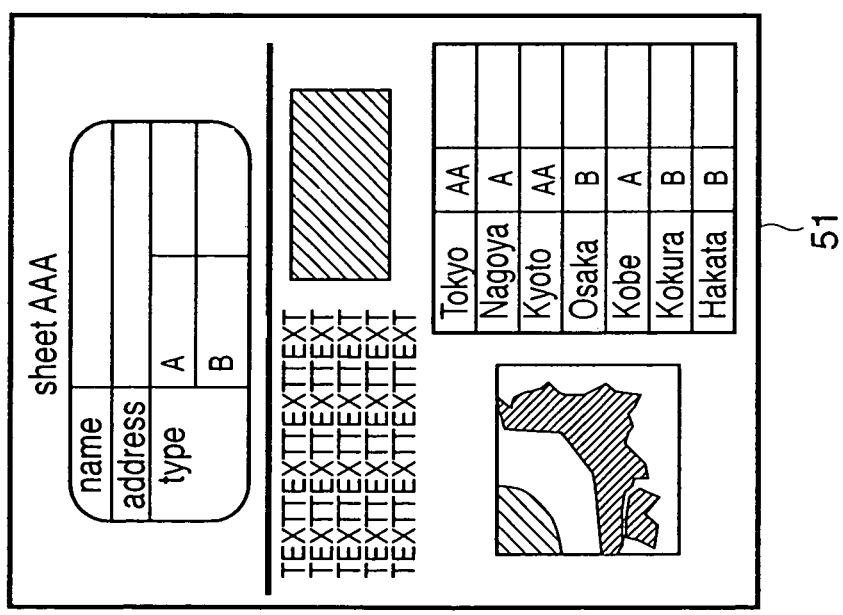

FIG. 5 is a view showing a state wherein image information of one page read by the image input device is segmented into a plurality of blocks by determining the property of each object contained in the image information. More specifically, in the block selection process, image information 51 of one page read in step S404 is recognized as a cluster 52 of objects, and the properties of the respective blocks are determined as text (TEXT), photo (PHOTO), line (LINE), table (TABLE), and the like so that the image data is segmented into regions (blocks) having different properties.

An embodiment of the block selection process will be described below.

An input image is binarized to monochrome image data. Outline tracking is executed to extract a cluster of pixels surrounded by black pixels. For a black pixel cluster having a large area, outline tracking is executed for white pixels in that cluster to extract a cluster of white pixels. A cluster of black pixels is also extracted recursively from a white pixel cluster having a predetermined area or more. The above-described process is executed for a document having black characters printed on a white background. A document of another type can be processed in the same way by setting the color corresponding to the background to "white" and that corresponding to an object to "black".

The obtained black pixel clusters are classified into regions having different properties in accordance with their sizes and shapes. For example, a pixel cluster having an aspect ratio of almost 1 and a size in a predetermined range is determined as a pixel cluster corresponding to a character. Furthermore, a portion where neighboring characters regularly line up and can be regarded as a group is determined as a text region. A low-profile pixel cluster is categorized as a line region. A range occupied by a black pixel cluster which includes rectangular white pixel clusters which regularly line up and have a predetermined size or more is categorized as a table region. A region where pixel clusters with indeterminate forms are distributed is categorized as a photo region. A cluster with an arbitrary shape is categorized as a graphic region. With this process, more advanced limits can be imposed for reuse of digital data created by reading one document.

FIG. 6 is a table showing an example of block information of respective blocks obtained by the block selection process in step S406. Information of each block shown in FIG. 6 is used as information for vectorization to be described later.

[OCR Process (Step S409)]

A character recognition process is executed by using a known OCR process technique. An example of the character recognition process will be described below.

A character recognition process is executed for each text block. For the character recognition process, in this embodiment, an image extracted for each character is recognized by using one of pattern matching methods, thereby obtaining a corresponding character code. In this recognition process, an observation feature vector obtained by converting a feature obtained from a character image into a several-ten-dimensional numerical value string is compared with a dictionary feature vector obtained in advance for each character type, and a character type with a shortest distance is output as a recognition result. Various known methods are available for feature vector extraction. For example, a method of dividing a character into a mesh pattern and counting character lines in respective meshes as line elements depending on their directions to obtain a (mesh count)-dimensional vector as a feature can be used.

When character recognition is to be executed for a text region extracted by the block selection process (step S406), the writing direction (horizontal or vertical direction) of the region is determined. Lines are extracted in the direction. Then, character images are obtained by extracting characters. In determining the writing direction (horizontal or vertical direction), horizontal and vertical projections of pixel values in that region are calculated. If the variance of the horizontal projection is larger than that of the vertical projection, the region is determined as a horizontal writing region. Otherwise, the region is determined as a vertical writing region.

Decomposition into character strings and characters is done in the following way. For horizontal writing, lines are extracted by using the horizontal projection. In addition, characters are extracted on the basis of the vertical projection for each extracted line. For a vertical writing text region, the relationship between "horizontal" and "vertical" is reversed. The character size can be detected on the basis of the extracted size.

[Vectorization Process (Step S410)]

The vectorization process in step S410 in FIG. 4 will be described next. As described above, when "text etc." is determined in step S407, input image information is vectorized for each block.

A font recognition process is executed for each character in the text blocks which have undergone character recognition by the OCR process.

<<Font Recognition>>

A plurality of sets of dictionary feature vectors for the number of character types used in character recognition are prepared in correspondence with character shape types, i.e., font types, and a font type is output together with a character code upon matching, thus recognizing the font of a character.

<<Vectorization of Character>>

Using a character code and font information obtained by the above-described character recognition process and font recognition process, the information of a character portion is converted into vector data by using outline data prepared in advance. When an input document image is a color image, the color of each character is extracted from the color image and recorded together with vector data.

With the above processes, image information which belongs to a text block can be converted into vector data with a nearly faithful shape, size, and color.

<<Vectorization of Non-Text Portion>>

For a region which is determined as a drawing, line, or table region by the block selection process in step S406, the outline of each extracted pixel cluster is converted into vector data. More specifically, a point sequence of pixels which form an outline is divided into sections at a point considered as a corner, and each section is approximated by a partial line or curve. "Corner" indicates a point where the curvature is maximal.

Figure 7:
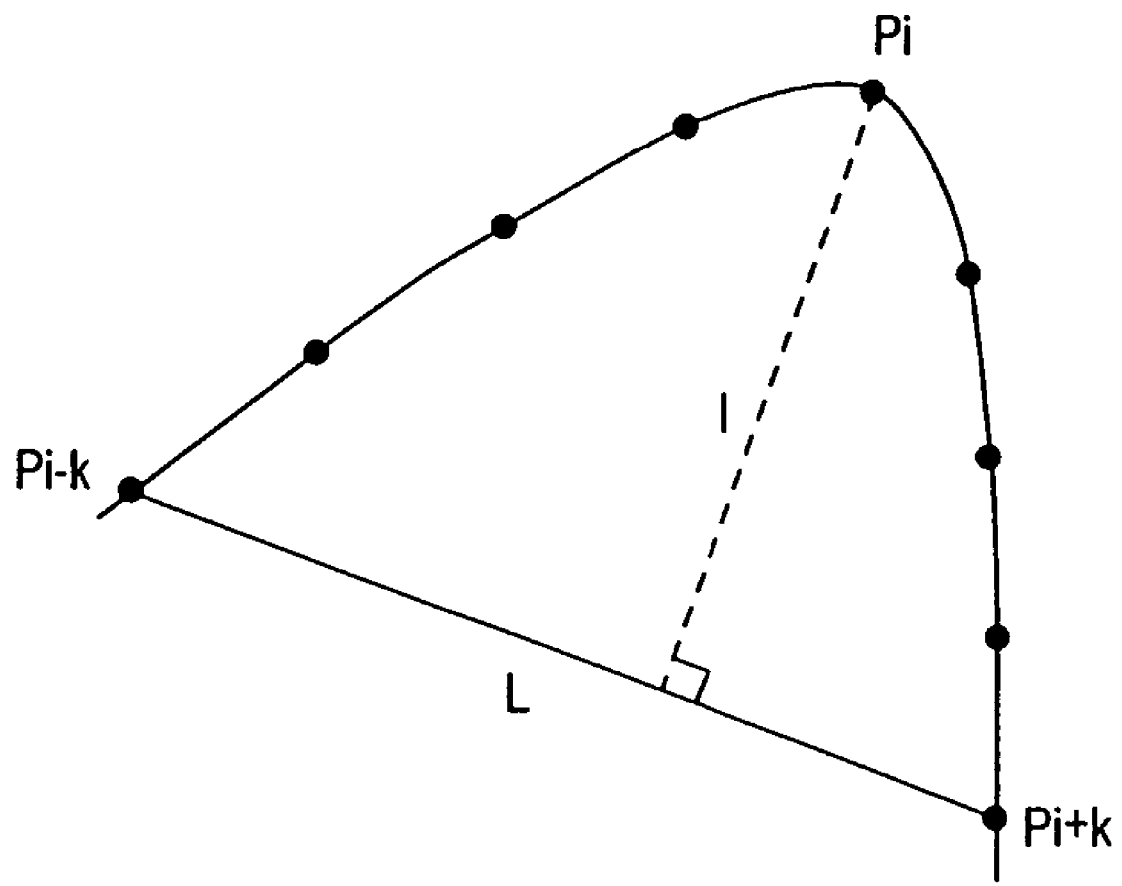
FIG. 7 is a view for explaining a point with a maximal curvature.

FIG. 7 is a view for explaining a point with a maximal curvature. As shown in FIG. 7, a chord is drawn between points Pi−k and Pi+k separated k points from an arbitrary point Pi to the left and right. A point with a maximal curvature is obtained as a point where the distance between the chord and the point Pi becomes maximal. Let R be the chord length/arc length between Pi−k and Pi+k. Then, a point where the value R is equal to or smaller than a threshold value can be regarded as a corner. Sections obtained by dividing the line at corners can be vectorized by using a method of least squares with respect to a point sequence for a line and a ternary spline function for a curve.

When the subject has an inner outline, it is similarly approximated by a partial line or curve by using a point sequence of a white pixel outline extracted by the block selection process.

As described above, when partial line approximation of outlines is used, the outline of a graphic with an arbitrary shape can be vectorized. When the input document is a color document, the color of each graphic is extracted from the color image and is recorded together with vector data.

Figure 8:
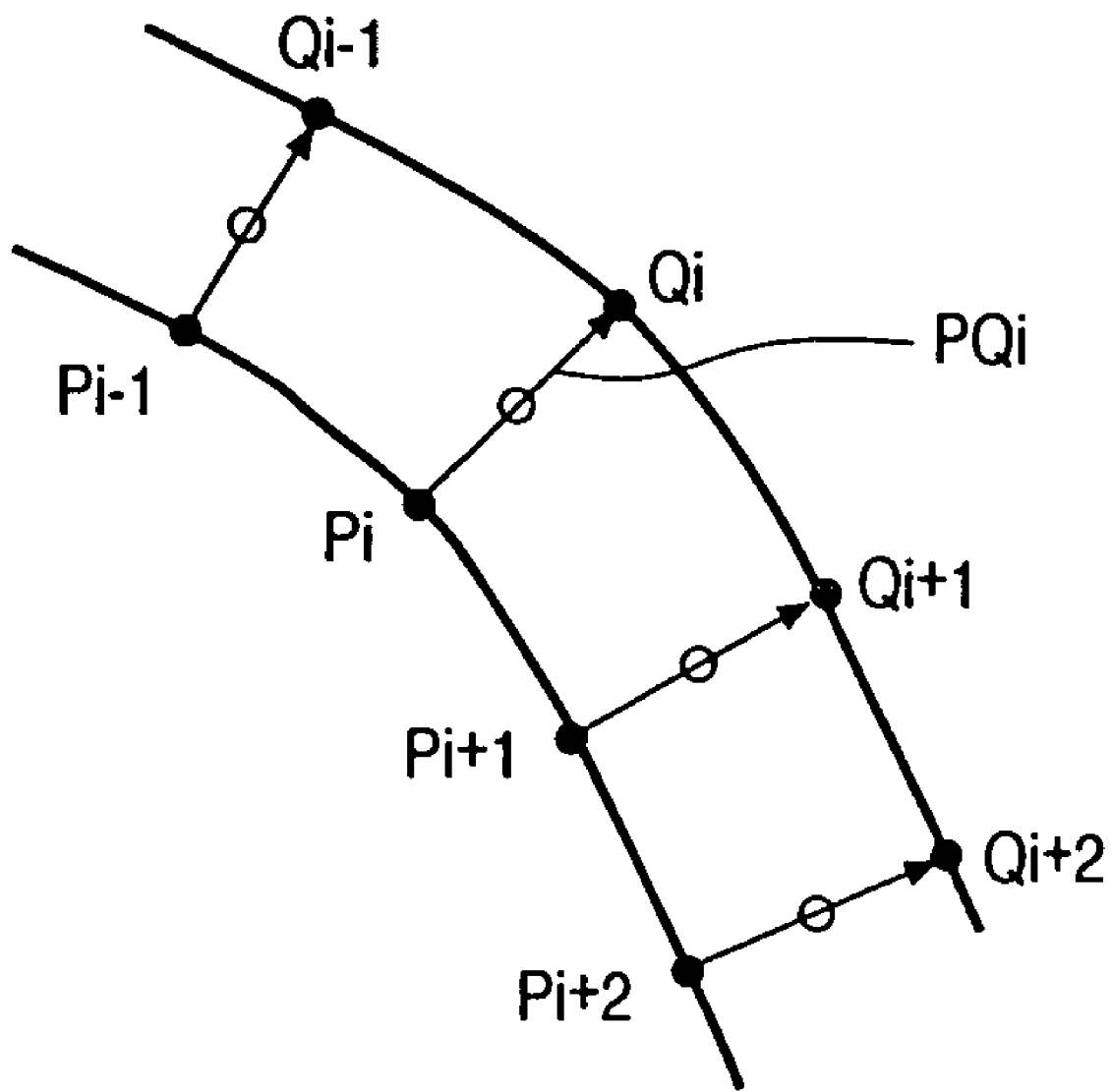
FIG. 8 is a view for explaining an example wherein an outer outline which is close to an inner outline or another outer outline is expressed as a line with a given width.

FIG. 8 is a view for explaining an example wherein an outer outline which is close to an inner outline or another outer outline is expressed as a line with a given width. When an outer outline is close to an inner outline or another outer outline in a given section, as shown in FIG. 8, the two outlines can combined and expressed as a line with a given width. More specifically, lines are drawn from points Pi on a given outline to points Qi on another outline such that two corresponding points have the shortest distance. When distances PQi maintain a predetermined value or less on the average, the section of interest is approximated by a line or curve using PQi middle points as a point sequence, and the average value of the distances PQi is set as the width of the line or curve. A line or a table ruled line as a set of lines can efficiently be expressed by vector data as a set of lines having a given width, as described above.

In vectorization using the character recognition process for a text block, a character which has the shortest distance from a dictionary as a result of the character recognition process is used as a recognition result, as described above. When this distance is equal to or larger than a predetermined value, the recognition result does not always match an original character, and a wrong character having a similar shape is often recognized. In this embodiment, therefore, such character is handled in the same manner as a general line art, as described above, and converted into outline data. That is, even a character that causes a recognition error in the conventional character recognition process can be vectorized on the basis of outline data which is visually faithful to image data without being vectorized to a wrong character. In the present invention, a block which is determined as a photo is not vectorized and is output as image data without any process.

<<Graphic Recognition>>

A process of grouping vectorized partial lines for each graphic object after the outline of a graphic with an arbitrary shape is vectorized, as described above, will be described below.

Figure 9:
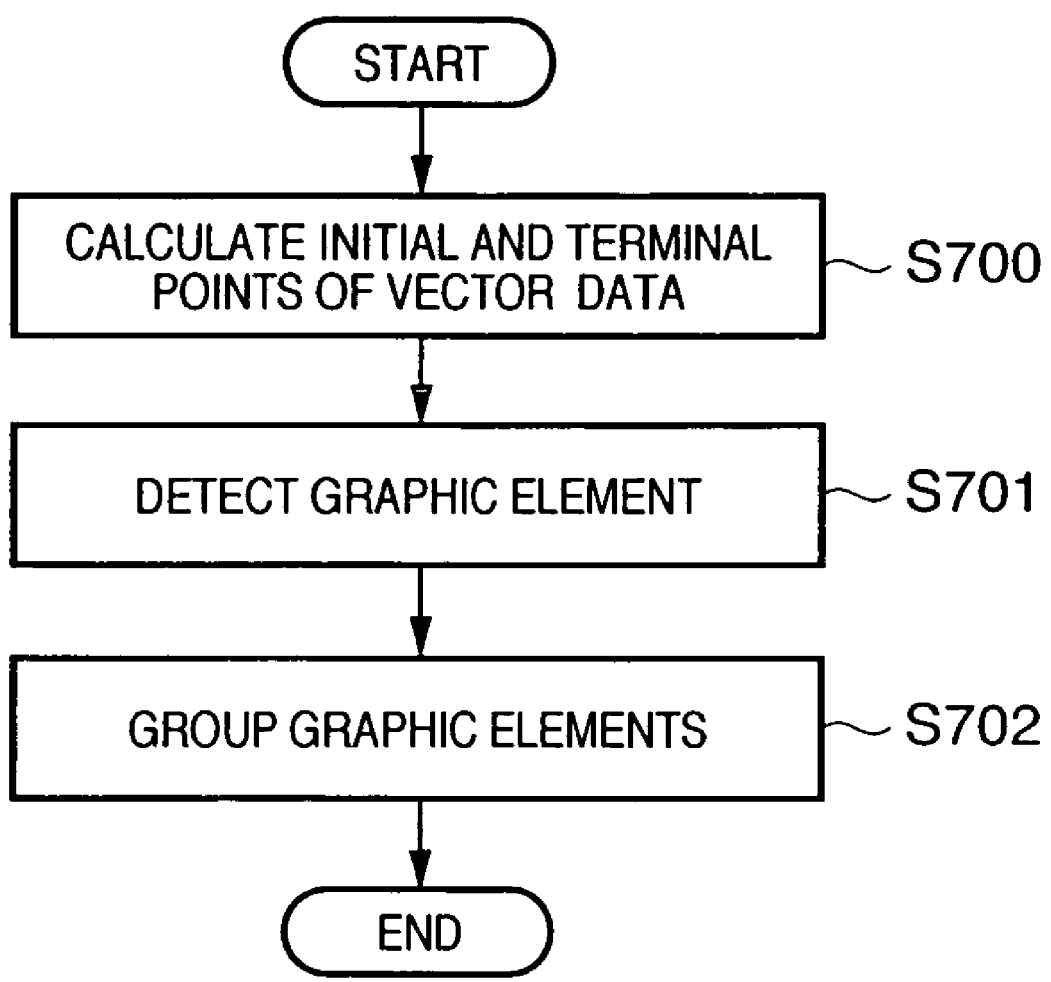
FIG. 9 is a flowchart for explaining process procedures executed until vector data are grouped for each graphic object.

FIG. 9 is a flowchart for explaining process procedures executed until vector data are grouped for each graphic object. Initial and terminal points of each vector data are calculated (step S700). Using the initial and terminal point information of respective vectors, a graphic element is detected (step S701). Detecting a graphic element is to detect a closed graphic formed by partial lines. Detection is executed by applying the principle that each vector which forms a closed shape has vectors coupled to its two ends.

Next, other graphic elements or partial lines present in the graphic element are grouped to set one graphic object (step S702). If any other graphic elements or partial lines are not present in the graphic element, the graphic element is set as a graphic object.

Figure 10:
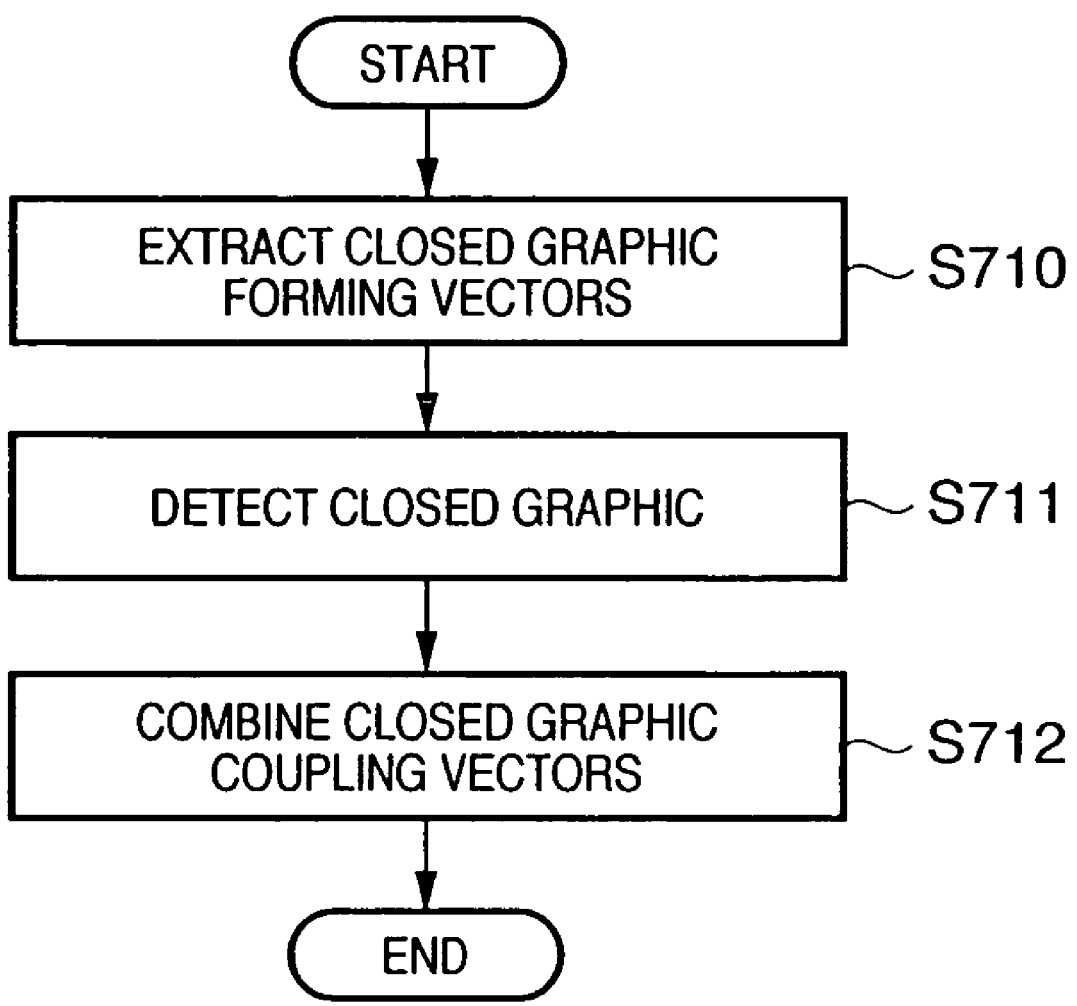
FIG. 10 is a flowchart for explaining process procedures of detecting a graphic element.

FIG. 10 is a flowchart for explaining process procedures of detecting a graphic element. Unwanted vectors each having two ends unconnected to other vectors are removed from vector data to extracted closed graphic forming vectors (step S710). The initial point of a vector of interest of the closed graphic forming vectors is set as a start point, and vectors are sequentially tracked clockwise. This tracking is executed until returning to the start point. All passing vectors are grouped as a closed graphic which forms one graphic element (step S711). All closed graphic forming vectors present in the closed graphic are also grouped. The initial point of a vector which is not grouped yet is set as a start point, and the above process is repeated. Finally, of the unwanted vectors removed in step S710, those which join the vectors grouped as the closed graphic in step S711 are detected and grouped as one graphic element (step S712).

With the above process, a graphic block can be handled as an independently reusable graphic object.

[Storage/Save of Vector File]

Figure 11:
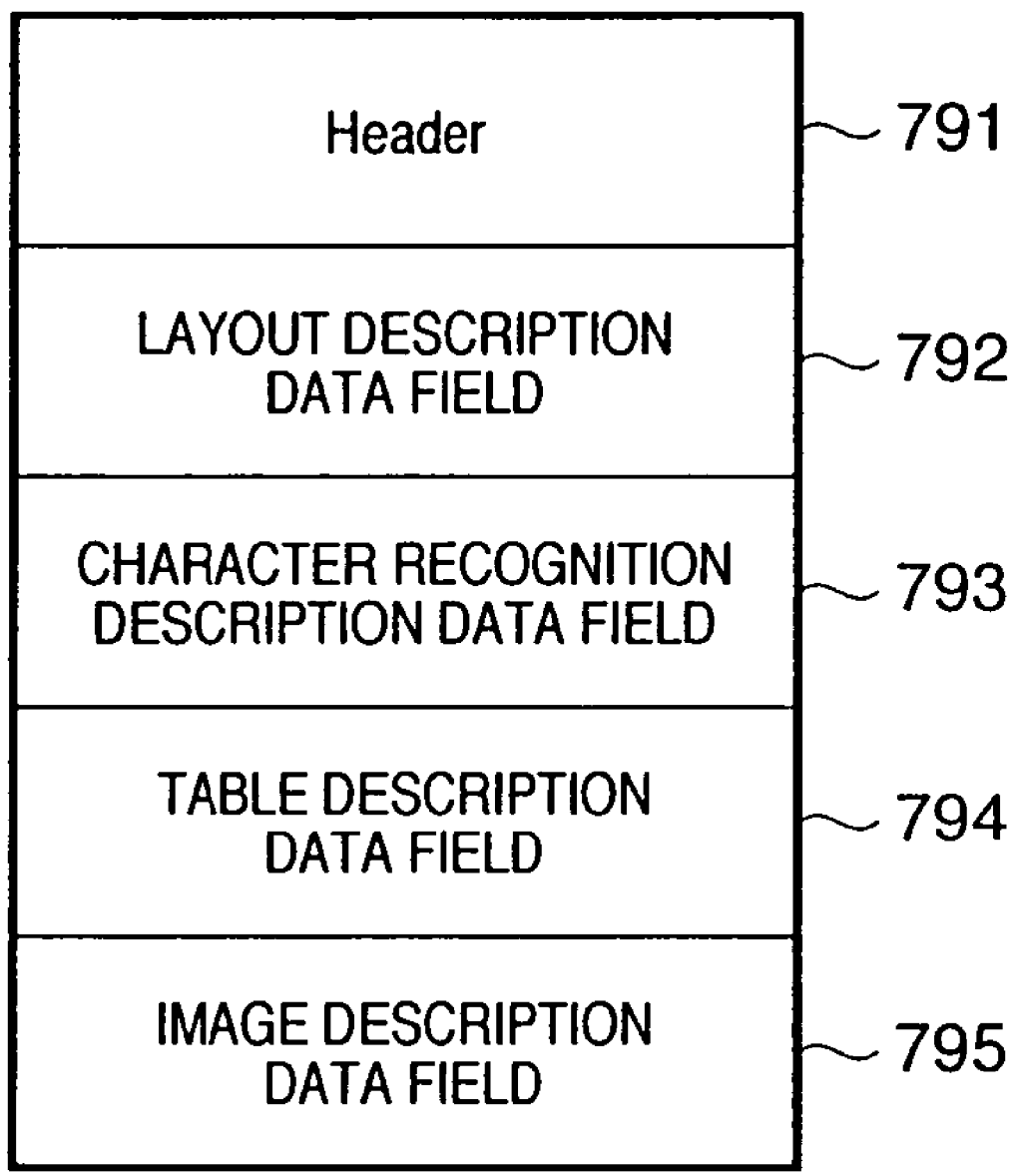
FIG. 11 is a view showing a DAOF data structure.

FIG. 11 is a view showing the data structure of a file having an intermediate data format as a result obtained by converting image data of one page by the block selection process (step S406) and the vectorization process (step S410). The data format shown in FIG. 11 is called a document analysis output format (DAOF). That is, FIG. 11 shows the DAOF data structure.

Referring to FIG. 11, reference numeral 791 denotes a Header which holds information about document image data to be processed. Reference numeral 792 denotes a layout description data field which holds property information and rectangular block address information of blocks in the document image data, which are recognized for the properties such as TEXT (text), TITLE (title), CAPTION (caption), LINEART (line art), PICTURE (natural image), FRAME (frame), and TABLE (table).

Reference numeral 793 denotes a character recognition description data field which holds character recognition results obtained by executing character recognition of TEXT blocks such as TEXT, TITLE, and CAPTION. Reference numeral 794 denotes a table description data field which stores details of the structure of TABLE blocks. Reference numeral 795 denotes an image description data field which holds image data of PICTURE blocks or LINEART blocks extracted from the document image data.

Such DAOF data itself is sometimes saved as a file in place of intermediate data. However, in the state of a file, individual objects cannot be reused by a general document creation application. A process of converting DAOF data into data to be post-processed will be described next.

Figure 12:
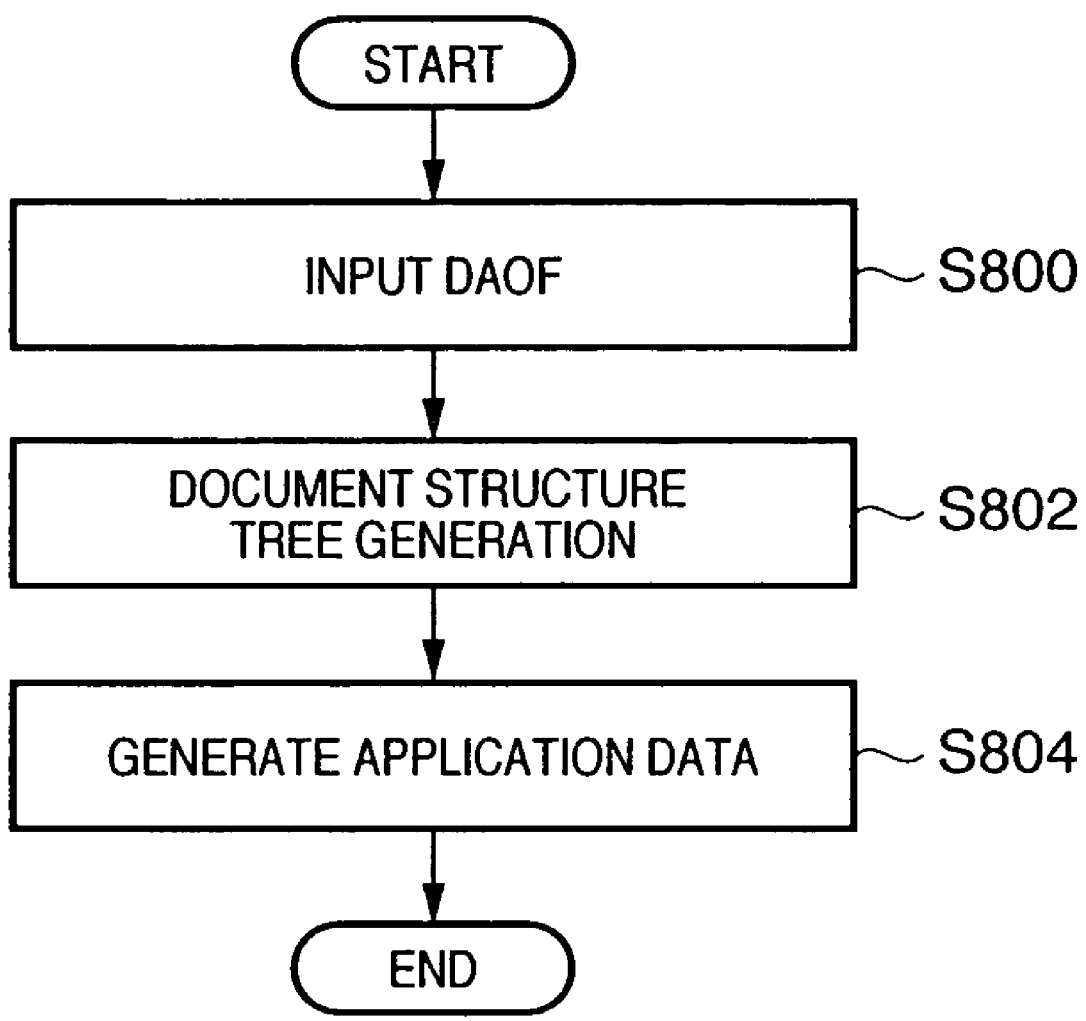
FIG. 12 is a flowchart for explaining schematic procedures of the overall conversion process into application data.

FIG. 12 is a flowchart for explaining schematic procedures of the overall conversion process into application data. DAOF data is input (step S800). A document structure tree serving as a base of application data is generated (step S802). Actual data in the DAOF are input on the basis of the generated document structure tree to generate actual application data (step S804).

Figure 13:
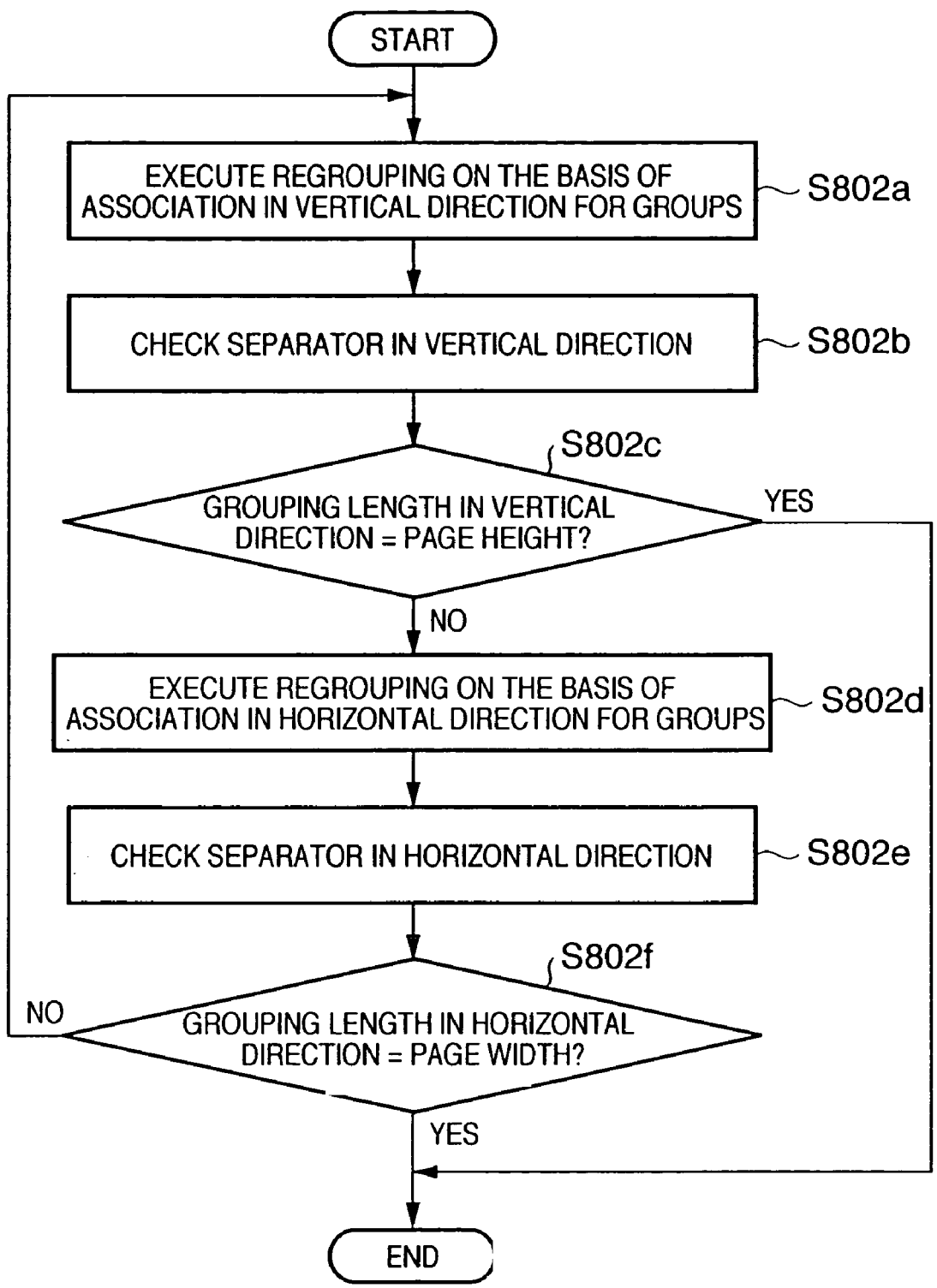
FIG. 13 is a flowchart for explaining detailed process procedures of a document structure tree generation process (step S802)

FIG. 13 is a flowchart for explaining detailed process procedures of the document structure tree generation process (step S802). FIGS. 14A and 14B are views for explaining the outline of the document structure tree. As the basic rule of overall control, the flow of processes transits from a microblock (single block) to a macroblock (a set of blocks). In the following description, a block indicates both a microblock and macroblock.

Regrouping is done for blocks on the basis of association in the vertical direction (step S802a). Immediately after the start, determination is done for each microblock. Association can be defined when the distance between blocks is small, and blocks widths (heights in case of the horizontal direction) almost equal. The pieces of information of distances, widths, and heights are extracted with reference to the DAOF.

FIG. 14A shows an actual page configuration, and FIG. 14B shows the document structure tree of the page. As a result of grouping in step S802a, T3, T4, and T5 form one group V1, and T6 and T7 form one group V2. These groups are generated as groups which belong to the same layer.

The presence/absence of a vertical separator is checked (step S802b). Physically, a separator is an object which has a line property in the DAOF. Logically, a separator is an element which explicitly divides blocks in an application. When a separator is detected, the groups are re-divided in the same layer.

It is determined by using the group length whether no more divisions can be present (step S802c). For example, it is determined whether the grouping length in the vertical direction equals the page height. If the group length in the vertical direction equals the page height (YES in step S802c), document structure tree generation is ended. In, e.g., the structure shown in FIGS. 14A and 14B, no separator is present, and the group height does not equal the page height. Since No in step S802c, the flow advances to step S802d.

In step S802d, regrouping is done for blocks on the basis of association in the horizontal direction. Even in this regrouping, the first determination immediately after the start is done for each microblock. Definitions of association and its determination information are the same as those in the vertical direction. In, e.g., the structure shown in FIGS. 14A and 14B, T1 and T2 generate a group H1, and V1 and V2 generate a group H2. The group H1 is generated as a group one level higher than T1 and T2. The group H2 is generated as a group one level higher than V1 and V2. The groups H1 and H2 belong to the same layer.

The presence/absence of a horizontal separator is checked (step S802e). Since a separator S1 is present in FIGS. 14A and 14B, it is registered in the tree so that the layers H1, S1, and H2 are generated. It is determined by using the group length whether no more divisions are present (step S802f). For example, it is determined whether the grouping length in the horizontal direction equals the page width. If the group length in the horizontal direction equals the page width (YES in step S802f), document structure tree generation is ended. If the group length in the horizontal direction does not equal the page width (NO in step S802f), the flow returns to step S802b to repeat the process from association check in the vertical direction in the layer higher one level. In, e.g., the structure shown in FIGS. 14A and 14B, since the division width equals the page width, the process is ended. Finally, an uppermost layer V0 representing the entire page is added to the document structure tree.

After the document structure tree is completed, application data is generated in step S804 on the basis of the information of the document structure tree. A practical example for the structure shown in FIGS. 14A and 14B will be explained below.

Since H1 includes the two blocks T1 and T2 in the horizontal direction, it is output as two columns. Internal information of T1 (text or image as the character recognition result with reference to the DAOF) is output. Then, a new column is set, and internal information of T2 is output. After that, S1 is output. Since H2 includes the two blocks V1 and V2 in the horizontal direction, it is output as two columns. Internal information of V1 is output in the order of T3, T4, and T5. Then, a new column is set, and internal information of V2 is output in the order of T6 and T7. In this way, the conversion process into vector data can be done.

Other Embodiment

In the above-described embodiment, it is automatically determined in step S407 on the basis of the ratio of properties obtained from the block selection process result whether to transmit URL+low-resolution thumbnail image or URL+vector data. Instead of automatic determination, the transmission form may arbitrarily be designated by the operator for the operation unit.

In the above-described embodiment, URL+low-resolution thumbnail image or URL+vector data is transmitted in step S416. Instead, both of the low-resolution thumbnail image and vectorized file may be transmitted together with URL.

In the above-described embodiment, URL+low-resolution thumbnail image or URL+vector data is transmitted. For a portion determined as Text property by the block selection process, a document obtained by the OCR process may be transmitted together. That is, URL+OCR document+low-resolution thumbnail image or URL+OCR document+vector data may be transmitted. Alternatively, an OCR document may be added to the structure to transmit URL+low-resolution thumbnail image or URL+vector data. As an example of the OCR document to be added, a document of a property area recognized as a large caption, a document with a predetermined point or more, a document near these documents, or a full text recognized as text property can be selected.

In the above-described embodiment, URL+low-resolution thumbnail image or URL+vector data is transmitted. Selection of a mode to select URL+OCR document may be possible. In this case, the mode is either arbitrarily selected by the operator from the operation unit or automatically selected when the number of blocks with Text property is large in the result of the block selection process.

In the above-described embodiment, a scanned image (scan image) is attached to e-mail, or vector data is generated. The above-described series of processes may be executed for print data from a client PC or image data obtained by a digital camera.

In the above-described embodiment, various kinds of data are attached to e-mail, and the e-mail is transmitted to the e-mail client. E-mail may be transmitted to any other device or application such as a PC, PDA, cellular phone, or car navigation system capable of transmitting, receiving, or transmitting/receiving e-mail.

In the above-described embodiment, a multifunction printer (MFP) has been exemplified as the image input/output device 10. However, the present invention is not limited to this. A device including only a scanner may be used. The above-described operation may be executed on a device such as a digital camera if it can input or store a sensed image.

In the above-described embodiment, the original scan image is stored and saved in the HDD 208 in the image input/output device 10. The image may be saved in a database server formed on the LAN connected to the image input/output device 10 or the Internet/intranet.

In the above-described embodiment, vector data generation and low-resolution thumbnail image generation are done by the controller in the image input/output device. The processes may be executed by an image processing server formed on the connected LAN or the Internet/intranet.

In addition to the above-described embodiment, a separation type for property separation by the block selection process may be selected such that thumbnail transmission or vector data transmission is selected in accordance with the separation type. When, e.g., the Image mode is selected, thumbnail transmission may be done.

In addition to the above-described embodiment, a separation type for property separation by the block selection process may be selected such that the selected object property is attached and transmitted in accordance with the separation type. When, e.g., the Text mode is selected, only objects having Text property are attached and transmitted.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

According to the present invention, image information can reliably be transmitted to the destination without attaching a large file which applies load to the e-mail system or reception terminal. In addition, the receiving side can easily acquire necessary image data on the basis of determination on the receiving side.

More specifically, when only URL serving as pointer information is transmitted upon attaching a document, the recipient cannot easily know the contents of the information from only the transmitted data. In the present invention, however, the recipient can easily know the contents of image information from only the received data without accessing any URL by browsing the document in the received data or an attached file such as a low-resolution thumbnail image or vector data. The original image information can be acquired as needed.

It is automatically determined on the basis of the ratio of object properties in the document whether to attach a low-resolution thumbnail image or vector data to the transmission data. Hence, the information can be provided by an optimal method corresponding to the device state when the receiving side confirms the contents of the image information. When vector data is attached, image information can be transmitted as a low storage file. Since the image information does not depend on the resolution, deterioration of image quality is small, and the data can be reused. As described above, according to the present invention, a system very convenient in transmitting image information between terminals can be provided.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-200804 filed on Jul. 7, 2004, which is hereby incorporated by reference herein.

What is claimed is:

1. An image processing system comprising:
an input unit, adapted to input image information including information related to a first type of object which is to be vectorized and a second type of object which is not to be vectorized;
a storage unit, adapted to store the input image information;
a first processing unit, adapted to execute a vectorization process on the information related to the first type of object included in the input image information;
a second processing unit, adapted to execute a resolution conversion process on the information related to both the first type of object and the second type of object included in the input image information, wherein resolution of information related to each of the first and second type of object after the conversion is lower than that before the conversion;
a determination unit, adapted to determine which of first information and second information is to be transmitted, based on a ratio of the first type of object and the second type of object included in the input image information, the first information including the first type of object that has been vectorized by said first processing unit and the second type of object that has not been vectorized, and the second information including the first type of object and the second type of object both of which are converted by said second processing unit; and
a transmission unit, adapted to transmit either the first information or the second information, based on a result of a determination by said determination unit, and to transmit location information indicating a storage location of the input image information stored in said storage unit.

2. The system according to claim 1, further comprising a segmentation unit, adapted to segment the input image information into a plurality of objects, and a property definition unit, adapted to define a property of each of the segmented objects, wherein said first processing unit executes the vectorization process on the first type of object based on the property defined by said property definition unit.

3. The system according to claim 1, wherein said transmission unit transmits an e-mail which includes either the first information or the second information as an attached file, and the location information as a text.

4. The system according to claim 2, wherein
said first processing unit generates text data based on an object which has a text property.

5. The system according to claim 4, further comprising
a selection unit, adapted to select one of an object recognized as a caption, an object including characters having not less than a predetermined size, and an entire object included in the input image information, wherein said transmission unit transmits the text data generated based on the object selected by said selection unit.

6. The system according to claim 2, wherein
said determination unit determines to transmit the first information in a case where a ratio of the number of objects which have a text property to the total number of segmented objects is not less than a predetermined value.

7. The system according to claim 2, wherein
said determination unit determines to transmit the second information in a case where a ratio of the number of objects which have an image property to the total number of segmented objects is not less than a predetermined value.

8. The system according to claim 1, further comprising a recognition unit, adapted to recognize instruction contents from a transmission destination to which the first information or the second information has been transmitted by said transmission unit, wherein said transmission unit transmits, based on the instruction contents recognized by said recognition unit, the input image information stored in said storage unit.

9. The system according to claim 1, wherein said input unit inputs, through one of a communication cable, a network, and an interface unique to the system, one of image information sensed by an image sensing device, image information stored in another device, and image information recorded on a portable recording medium.

10. The system according to claim 1, wherein the location information is pointer information which represents position information, on a network, of the image information stored in said storage unit.

11. The system according to claim 1, wherein said first processing unit executes one of a character code process, an outline process, and a function process by an OCR process on an object having a text property.

12. The system according to claim 1, wherein said first processing unit executes one of an outline process and a function process on an object having a graphic property.

13. An image processing method comprising:
using an image processing computer system to perform the steps of:
an input step of inputting image information including information related to a first type of object which is to be vectorized and a second type of object which is not to be vectorized;
a storage step of storing the input image information;
a first processing step of executing a vectorization process on the information related to the first type of object included in the input image information;

a second processing step of executing a resolution conversion process on the information related to both the first type of object and the second type of object included in the input image information, wherein resolution of the second information related to each of the first and second type of object after the conversion is lower than that before the conversion;

a determination step of determining which of first information and second information is to be transmitted, based on a ratio of the first type of object and the second type of included in the input image information the first information including the first type of object that has been vectorized by said first processing unit and the second type of object that has not been vectorized, and the second information including the first type of object and the second type of object both of which are converted by said second processing unit; and a transmission step of transmitting either the first information or the second information based on a result of the determination in said determination step, and transmitting location information indicating a storage location of the input image information stored in said storage step.

14. The method according to claim 13, further comprising:
a segmentation step of segmenting the input image information into a plurality of objects, and
a property definition step of defining a property of each of the segmented objects, wherein said first processing step executes the vectorization process on the first type of object based on the property defined in the property definition step.

15. A computer-readable recording medium having a program stored thereon for causing a computer to execute procedures comprising:
an input procedure of inputting image information including information related to a first type of object which is to be vectorized and a second type of object which is not to be vectorized;
a storage procedure of storing the input image information;
a first procedure of executing a vectorization process on the information related to the first type of object included in the input image information, the first information including also the information related to the second type of object that has not been vectorized;
a second processing step of executing a resolution conversion process on the information related to both the first type of object and the second type of object included in the input image information, wherein resolution of the second information related to each of the first and second type of object after the conversion is lower than that before the conversion;
a determination step of determining which of first information and second information is to be transmitted, based on a ratio of the first type of object and the second type of included in the input image information the first information including the first type of object that has been vectorized by said first processing unit and the second type of object that has not been vectorized, and the second information including the first type of object and the second type of object both of which are converted by said second processing unit; and
a transmission procedure of transmitting either the first information or the second information based on a result of the determination in said determination procedure, and transmitting location information indicating a storage location of the input image information stored in said storage procedure.

* * * * *